United States Patent [19]
Lewis

[11] Patent Number: 5,867,981
[45] Date of Patent: Feb. 9, 1999

[54] SOLID ROCKET MOTOR

[75] Inventor: Joseph W. Lewis, Edwards AFB, Calif.

[73] Assignee: The United States of America as represented by the Secretary of the Air Force, Washington, D.C.

[21] Appl. No.: 718,929

[22] Filed: Jan. 28, 1985

[51] Int. Cl.[6] .................................................... F02K 1/00
[52] U.S. Cl. ............................ 60/271; 149/19.6; 149/92
[58] Field of Search ...................... 149/19.6, 92; 60/271

[56] References Cited

U.S. PATENT DOCUMENTS

| | | |
|---|---|---|
| 3,855,789 | 12/1974 | Platzek . |
| 3,924,405 | 12/1975 | Cohen . |
| 4,268,450 | 5/1981 | Frankel ................................. 149/19.6 |
| 4,379,903 | 4/1983 | Reed ..................................... 149/19.6 |
| 4,450,110 | 5/1984 | Simmons ................................. 149/92 |

OTHER PUBLICATIONS

M. Farber et al. "Mass Spectrometric Kinetic Studies on Several Azido Polymers"; Combustion & Flame 55:203–211 (1984).

*Primary Examiner*—Donald P. Walsh
*Attorney, Agent, or Firm*—Charles F. Bricker; Thomas L. Kunder

[57] ABSTRACT

A solid rocket motor having a main propellant comprising glycidyl azide polymer, combustible solids and a plasticizer.

2 Claims, 1 Drawing Sheet

SOLID ROCKET MOTOR

RIGHTS OF THE GOVERNMENT

The invention described herein may be manufactured and used by or for the Government of the United States for all governmental purposes without the payment of any royalty.

BACKGROUND OF THE INVENTION

This invention relates to an improved solid rocket engine.

Conventional solid rocket engines comprise a solid propellant, a case which defines the combustion chamber for the propellant, and an exhaust nozzle, as well as means for igniting the propellant. Research directed to each of the major components of rocket engines continues in efforts to reduce cost, reduce dead weight, and increase engine thrust.

The most severe heating of the hardware takes place at the exhaust nozzle. High-velocity gas at high temperature oxidizes, softens, wears and erodes the nozzle material. Metal nozzles, with or without protective coverings, may be used for short-duration burns. Ceramic nozzles have been successful for long periods of time. Carbon—carbon nozzles have also been successful.

One application for which nozzle research is considered important is the integral rocket-ramjet engine. Early prototypes of this type engine merely mounted a rocket engine in tandem with a ramjet engine. Current designs of integral rocket-ramjet engines employ a single combustion chamber. This chamber initially contains a solid rocket propellant. Following ignition and burning of the propellant, the chamber is converted for ramjet operation.

The two modes of operation, i.e., rocket mode and ramjet mode, require exhaust or thrust nozzles of different cross-sectional areas due to the difference of pressure, volume and velocity of the exhuast gases while operating under each mode. One manner of attaining this end is to provide a rocket nozzle which telescopes within the ramjet nozzle and is ejected at rocket burnout, providing a larger nozzle for ramjet operation. An example of this approach is disclosed by Platzek, U.S. Pat. No. 3,855,789.

While the telescoping, ejectable nozzle disclosed by Platzek provides a solution to the requirement for dual nozzles, it also introduces other problems, such as the ejected nozzle itself. In the case of air-launched vehicles, any ejecta is desirably avoided, because it is possible that the ejecta might fall directly in the path of the launching aircraft.

The nozzleless rocket motor was developed to replace the conventionally nozzled motor in a number of specialized applications. The nozzleless motor is less expensive, requires less insulation, eliminates the dead weight of a rocket nozzle, accepts more propellant in a given case volume and eliminates ejecta in integral rocket-ramjet systems. The nozzleless rocket motor comprises a major portion of main grain propellant and a minor portion of a slower burning nozzle propellant. The nozzle propellant is used to form a throat and to provide an expansion surface for the exhaust gases. As used herein, and in the claims the term "nozzleless" is intended to mean a solid rocket motor which does not comprise a separate nozzle.

In these nozzleless rocket motors it is desirable that the nozzle portion burn slow enough to hold up as a nozzle, yet fast enough to contribute to the overall thrust. If the burn rate of the nozzle propellant is too slow, diminution of the nozzle is determined by the erosive environment provided by upstream gases. If the burn rate of the nozzle propellant is too fast, i.e., greater than the minimum rate determined by the erosive upstream gases, the nozzle throat opens too quickly.

The main grain propellant has evolved from the black powder used in early rockets, through the double-base propellants such as those based on nitroglycerine and nitrocellulose, to the composite propellants of today which consist of crystalline. finely-ground oxidizer particles dispersed in a matrix of a fuel compound.

It is an object of the present invention to provide an improved nozzleless solid rocket motor comprising means for reducing erosive burning effects in the nozzle portion.

Other objects and advantages of the present invention will be apparent to those skilled in the art.

SUMMARY OF THE INVENTION

In accordance with the present invention there is provided a solid rocket motor comprising a rocket case having a closed front end and an open second end, and a centrally ported propellant grain comprising a main portion and a nozzle portion, wherein the main portion is a shaped and cured first propellant composition, wherein the nozzle portion comprises a shaped and cured second propellant composition, and wherein the first propellant comprises glycidyl azide polymer binder.

DESCRIPTION OF THE INVENTION

Figure 1:
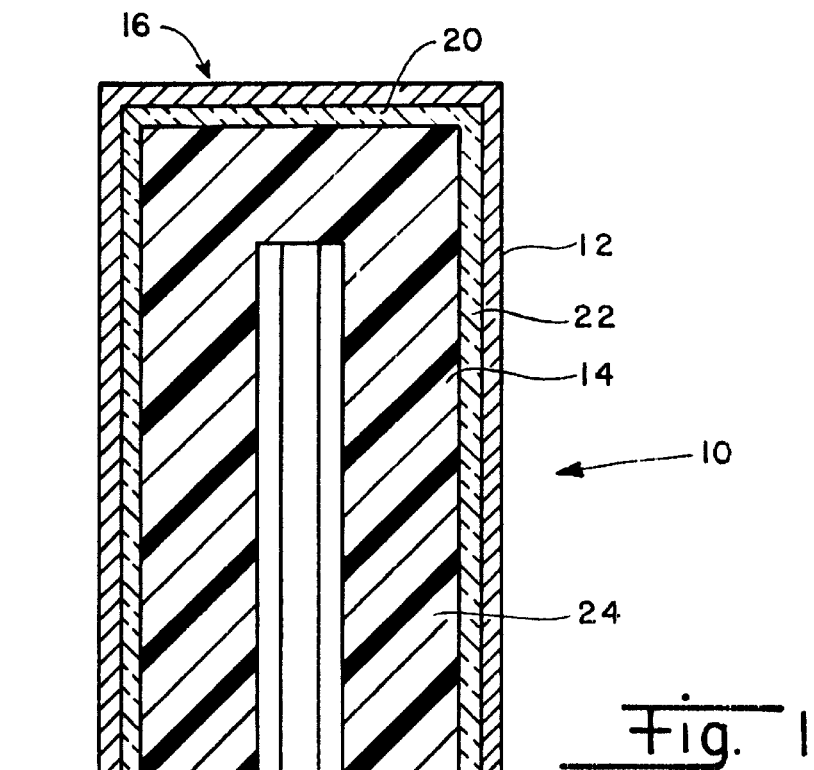
FIG. 1 is a longitudinal cross-section illustrating a rocket motor in accordance with the invention.
Figure 1:
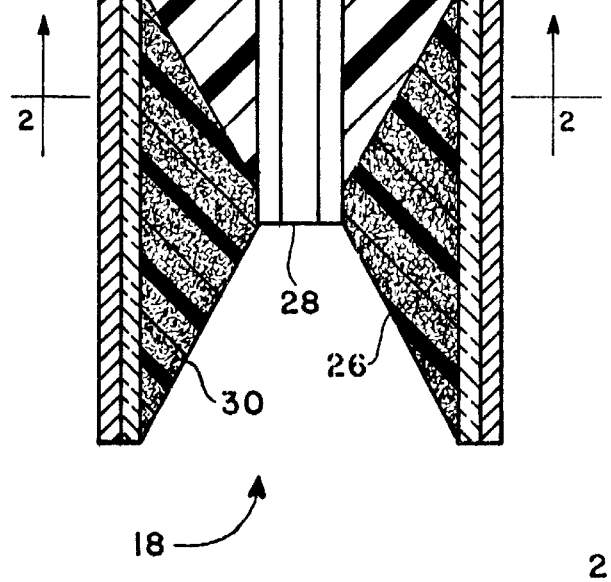
Figure 2:
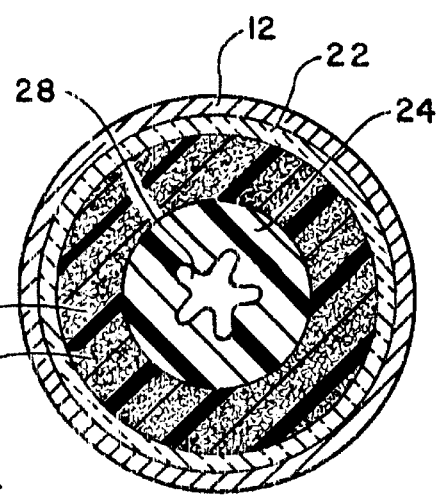
FIG. 2 is a section through 2—2 of FIG. 1.

In the drawing, reference numeral 10 indicates an illustrative nozzleless rocket motor which comprises a case 12 and a propellant grain 14. The case 12 has a closed first end 16 and an open second end 18. A layer 20 of insulation is shown disposed between the closed first end 16 and the grain 14 and a layer 22 is shown disposed between the cylindrical wall of the case 12 and the grain 14. The insulation layers 20 and 22 can be any insulating material known in the art, such as, for example, the silicon-based ablative elastomeric material designated DC 93104, available from the Dow Corning Company, Midland, Mich.

The propellant grain 14 comprises a main portion 24, a nozzle portion 26 and a central port 28. The main portion 24 comprises a shaped and cured first propellant composition and the nozzle portion 26 comprises a shaped and cured second propellant composition.

The central port 28 is illustrated as having a five-point star configuration, although the invention is not limited thereto. The star configuration provides a relatively constant thrust for the effective high-thrust period of the rocket motor.

The first propellant composition comprises about 12 to 20 weight percent of glycidyl azide polymer, about 60 to 70 weight percent of combustible solids, about 10 to 20 weight percent of a plasticizer, and about 1 to 3 weight percent of various other ingredients. Glycidyl azide polymer (GAP) has a repeating two-carbon backbone with one indirectly attached azide group. The molecular weight of GAP ranges from about 2000 to about 5000 molecular mass units. GAP has the general formula

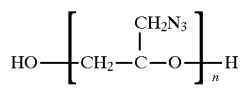

wherein n is an integer representing the number of repeating units of the polymer.

The combustible solids include oxidizers such as ammonium perchlorate, cyclotetramethylenetetranitramine (HMX), cyclotrimethylenetrinitramine (RDX), triaminoguanidine nitrate (TAGN) and the like, including mixtures thereof. The plasticizer includes the nitrate ester plasticizers such as nitroglycerine (NG), trimethylol ethane trinitrate (TMETN), triethylene glycol dinitrate (TEGDN), butane trioltrinitrate (BTTN), and the like, including mixtures thereof. Various other ingredients include cure promoters, stabilizers, carbon black, metallic carbides and the like.

The second propellant composition which constitutes the nozzle portion 26 has a lower burn rate than the first propellant composition and, preferably, comprises a plurality of an aromatic polyamide fibers homogeneously disposed therethrough. A representative few fibers are indicated by the reference numeral 30. The lower burn rate of the nozzle portion propellant allows this portion to hold up as a nozzle. The aromatic amide fibers distributed throughout the nozzle portion are exposed as the surface of the nozzle portion burns away. Although I have no desire to be restricted to any particular theory of operation, it appears that the exposed fibers create a region of laminar exhaust gas flow close to the surface of the nozzle portion. The laminar heat transfer coefficient is less than the turbulent heat transfer coefficient. Thus, there is less heat transfer at the nozzle propellant surface and less thermal and mechanical erosion. During mixing of the nozzle propellant formulation about 0.05 to 0.25 weight percent of aromatic amide fibers are introduced into the formulation. These fibers may be made of Kevlar, available from DuPont Company, Wilmington, Del., an aromatic amide having repeating units of the general formula:

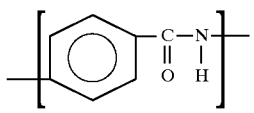

The fibers are employed as chopped fibers having diameters of from about 1 to about 2 microns and lengths of about 0.25 to 0.75 cm. The fibers can be broken during mixing, so mixing is controlled to prevent destruction of the fibers.

The propellant grain 14 is cast into two stages. In the first stage, the case 12 is held in an inverted position, with the open end 18 extending upward. A mandrel of suitable shape to form the central port 28 is inserted into the case and held at its center. The first propellant mixture is poured into the case; then a plug having the same shape as the desired propellant nozzle is inserted in the case into contact with the first propellant, pushing the plug downward so as to shape the first propellant and expel any air trapped between the propellant and the plug. After the first propellant has cured, the plug is removed, leaving the mandrel in place. The second propellant is mixed, then poured into the case. A second plug, having a shape complementary to the exit cone of the nozzle portion is inserted and pushed downward so as to shape the exit cone. After curing the second propellant, the second plug and the shaped mandrel are removed.

The following example illustrates the invention:

EXAMPLE

A series of nozzleless rocket motors were prepared according to the general procedure described previously using a round mandrel to achieve high volumetric loading of the motor. The main portion of the grain was a GAP propellant having a burn rate of 1.13 ips of the following composition:

(C) TABLE I

| Ingredient | wt % |
|---|---|
| GAP | 16.56 |
| N-1000 | 1.07 |
| HDI | 1.07 |
| Ammonium Perchlorate | 63.00 |
| ZrC | 1.00 |
| Carbon | 0.10 |
| TMETN | 16.95 |

The nozzle portion of the grain was a reduced smoke HTPB propellant having a burn rate of 0.51 ips. The motors were mounted in a standard test firing fixture and fired. Performance was measured in terms of specific impulse ($I_{sp}$). The $I_{sp}$ was determined by dividing the action time total impulse (ATTI) by the weight of propellant burned, where ATTI is the area under the thrust-time curve between 10% of maximum thrust at both ends of the curve. It is intended to reflect the useful portion of thrust during motor burn. Exemplary test results are shown in the following table:

(C) TABLE II

| Example Run | Run Type | $I_{sp}$ (Sec) |
|---|---|---|
| 1 | Baseline* | 172.9 |
| 2 | with Nozzle | 207.4 |
| 3 | with Nozzle | 206.5 |

*Main grain only — No nozzle.

Various modifications may be made without departing from the spirit of the invention or the scope of the following claims.

I claim:

1. In a solid rocket motor comprising
   a. a rocket case having a closed first end and an open second end; and
   b. a centrally ported propellant grain comprising:
      i. a main portion consisting of a shaped and cured first propellant composition, and
      ii. a nozzle portion consisting of a shaped and cured second propellant composition;
      wherein said second composition has a lower burn rate than said first composition; and wherein said nozzle portion has a diverging exit cone in communication with the central port extending through said nozzle portion and into said main portion;
   the improvement wherein said first propellant composition comprises about 12 to 20 weight percent of glycidyl azide polymer, about 60 to 70 weight percent of combustible solids, and about 10 to 20 weight percent of a plasticizer.

2. The rocket motor of claim 1 wherein said first propellant composition comprises about 16.86 weight percent of glycidyl azide polymer, about 63.00 weight percent of ammonium perchlorate and about 16.95 weight percent of TMETN.

* * * * *